Nov. 7, 1967     L. R. PADBERG, JR     3,351,902
UNDERWATER SOUND SOURCE
Filed Dec. 30, 1965
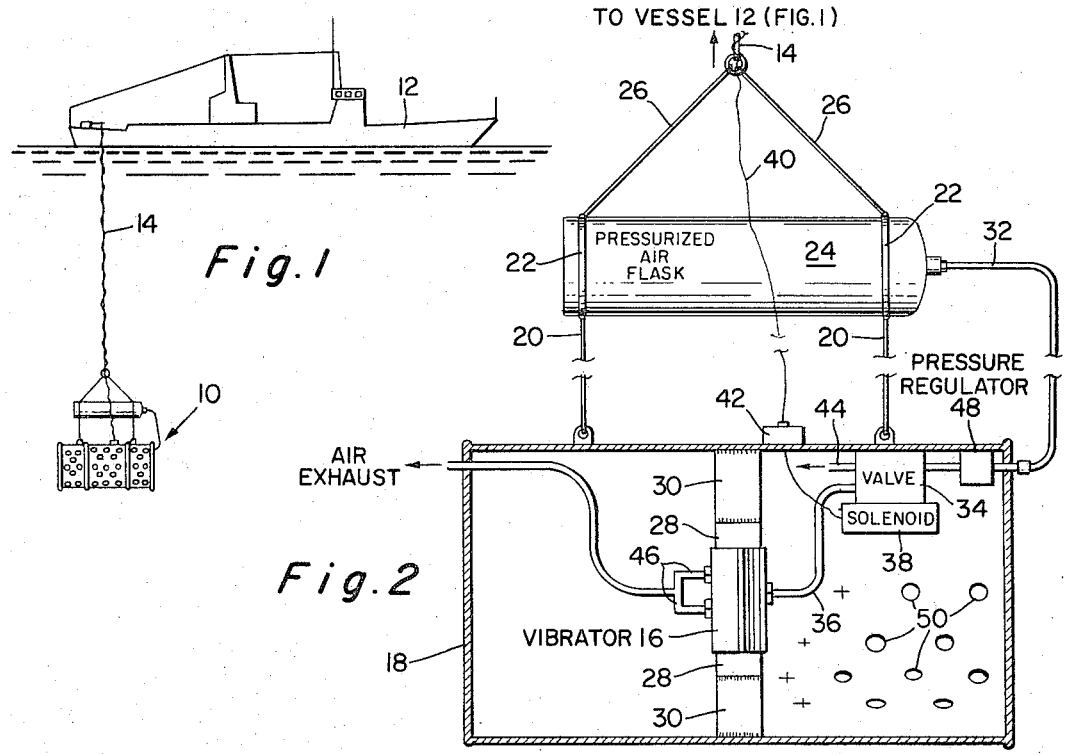
Fig.1
Fig.2
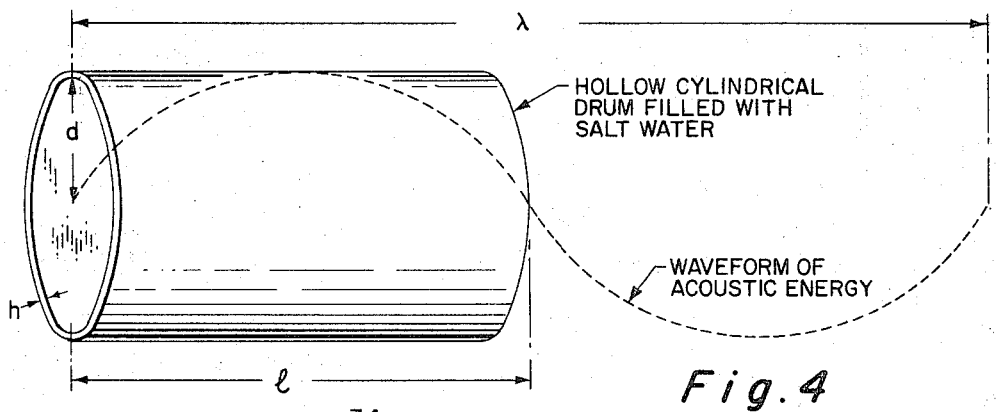
Fig.4
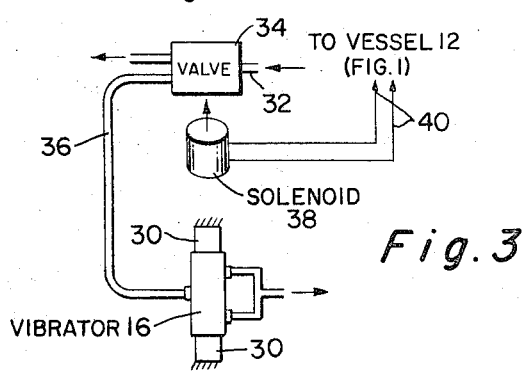
Fig.3
INVENTOR.
LOUIS R. PADBERG JR.

3,351,902
UNDERWATER SOUND SOURCE
Louis R. Padberg, Jr., 22 Rincon Vista,
Santa Barbara, Calif. 93103
Filed Dec. 30, 1965, Ser. No. 517,872
4 Claims. (Cl. 340—12)

ABSTRACT OF THE DISCLOSURE

An underwater sound source designed for deep submergence and including a chamber capable of being set into resonance upon operation of a vibrator contained therewithin, the latter being controllable from the surface. Acoustic energy in the form of pulses is produced, these pulses being variable in spacing and time duration as well as possessing broad-band frequency characteristics.

---

The invention described herein may be manufactured and used by or for the Government of the United States of America for governmental purposes without the payment of any royalties thereon or therefor.

The present invention relates to underwater sound sources, and more particularly to a high-intensity underwater sound source capable of acting as one component of a long-distance communication system.

In recent years there has been an increasing need for an efficient and reliable device which will enable underwater communication to be carried out over relatively long distances. At the present time there are a number of arrangements available by means of which information may be conveyed through water to a receiver which is not too remote from the point of transmission, but there is no completely successful data-transmission system known which will operate with reliability over long distances due to the high attenuation of acoustic energy in passing through a liquid medium. Conventional underwater sound sources now in use are almost exclusively intended for shallow submergence, and, consequently, function very poorly, if at all, at considerable depths. Also, many of the components employed in such conventional apparatus become inoperative when exposed to high hydrostatic pressure. Furthermore, such devices can normally handle only very low power inputs. If provision is made for operation at higher energy levels, and if the devices are so constructed as to withstand the pressure at great depths, then their size and/or weight become excessive—the latter, for example, occasionally approaching a figure of several tons. They are consequently impracticable for ordinary communication purposes.

The only presently-known method for transmitting acoustic energy over great distances through a body of water is by detonating an explosive charge in the deep sound channel, such, for example, as below the thermocline where there is a sharp discontinuity between adjacent bodies of water and hence a sharp temperature differential. The explosion of such a charge has been detected at points thousands of miles away from the source, but this method is not feasible for communication purposes since it is basically a "single-shot" affair.

It would be highly desirable to have available some form of intelligence-communication system which would be simple, reliable, economical, and capable of utilization for both commercial applications and military purposes, such, for example, as between submarines, surface ships and helicopters, as well as for various ASW functions. Apparatus of this nature would also be useful in the offshore geophysical industry.

Although sonar systems are widely employed at the present time, they have a rather limited range, and, furthermore, the transmission is on a relatively narrow frequency band. For many types of communication, it is desirable that the bandwidth of the transmitted energy be fairly high in order to facilitate detection of the signal especially where its amplitude has diminished to a point where it is difficult to isolate from the ambient noise. Furthermore, it is highly desirable that the frequency of the sound source be as low as possible, since it has been determined that, generally speaking, the transmission of acoustic energy through a body of water varies in inverse proportion to its frequency. For these reasons, broad-band energy is preferable because the lower components are more readily detected at a distance. However, should the receiver approach the point of transmission, the higher frequencies are more useful for classifying the sound source per se.

In accordance with a feature of the present invention, an underwater sound source is provided which is capable of being operated at a considerable depth below the surface of a body of water, where optimum sound propagation is known to be feasible. This energy source is so designed as to generate signals having broad-band characteristics, and which can be readily "keyed" so as to permit the transmission of any known type of intelligence, such, for example, as pulses of the type employed in international code. These signals may possess either long or short time periods, and are completely controllable from the surface craft to which a cable or supporting member for the sound source is attached. A feature of the sound source herein described is that the acoustic energy is genertaed by pneumatic rather than electrical means, and the amplitude of the generated energy is raised to a high level by incorporating into the apparatus a chamber or enclosure capable of being set into resonance at its natural frequency of vibration. Accordingly, the power output of the unit may reach a level such that the transmitted energy can be received at distances well beyond one hundred miles from the point at which the energy is generated. Inasmuch as all of the components of the sound source are constructed to withstand considerable hydrostatic pressure, the entire unit can be lowered, if desired, into the deep sound channel (approximately 3000 feet) where long-range transmission of the developed sound is possible. However, if shorter ranges are satisfactory, the equipment is lowered so as to be just below the thermocline.

A still further feature of the invention is that the frequency at which the sound vibrations are generated is controllable over a fairly wide range in accordance with the particular results which are desired. If the intelligence transmission is to be in the form of pulses, both the time duration of each pulse and the time separation therebetween may be selected by an operator stationed on the surface vessel from which the equipment has been lowered. Furthermore, by incorporating a flask of pressurized air into the sound-generating unit itself, the need for running a long hose or conduit to the surface is eliminated, and such cumbersome equipment is replaced by a simple electrically-controlled solenoid valve located in close proximity to the pressurized air flask per se. As a result, the overall weight of the equipment is reduced to a minimum.

One object of the present invention, therefore, is to provide a new and improved underwater sound source.

A further object of the invention is to provide a reliable and efficient underwater sound source which is capable of producing intense low-frequency sound pulses that can be transmitted over long distances.

An additional object of the invention is to provide, an efficient, reliable and economical sound source preferably of the pneumatically-operated type, and which incorporates means for resonating the developed energy to cause the latter to reach a high level of magnitude.

A still further object of the present invention is to provide an efficient, reliable and economical sound source which is so constructed as to withstand considerable hydrostatic pressure while developing broad-band, low-frequency energy of a type that may be selectively keyed in order to convey intelligence in the form of time-displaced pulses.

Other objects, advantages and novel features of the invention will become apparent from the following detailed description of the invention when considered in conjunction with the accompanying drawings wherein:

FIG. 1 is a schematic showing of an underwater sound source designed in accordance with the principles of the present invention, and showing the manner in which the sound source may be lowered into a body of water from a surface vessel;

FIG. 2 is a detailed view, partly broken away, of the sound source of FIG. 1;

FIG. 3 is a detailed view of a portion of FIG. 2; and

FIG. 4 is an exterior view of a resonant chamber such as might be utilized in carrying out the present invention, together with symbols helpful in calculating its resonant frequency.

Referring now to the drawings, and particularly to FIG. 1 thereof, there is shown an underwater sound source embodying the principles of the present invention. This sound source, generally identified by the reference numeral 10, is intended to be lowered into a body of water from a surface vessel 12. The depth to which the assembly 10 is lowered depends upon a number of factors, a principal one being the distance over which the generated energy must travel in order to reach an intended receiver. However, other considerations, such as the temperature of the water, the proximity of land masses, and the nature and sensitivity of the receiving equipment, all enter into a determination of the optimum distance or depth to which the unit 10 should be lowered. Such considerations are in general well known, and no further discussion thereof will be set forth in the present application.

It will be noted from FIG. 1 that a single cable 14 connects the unit 10 with the surface vessel 12. Apart from supporting the weight of the unit 10, the cable 14 carries an electrical conductor which is visible in FIG. 1 and which will be subsequently described in connection with FIG. 2 of the drawings. Although the unit 10 is pneumatically operated, it is important to note that no air hose or conduit leads to the surface in addition to the electrical conductor above mentioned.

In FIG. 2 of the drawings there is shown a detailed view of the sound unit 10 of FIG. 1. The assembly includes a pneumatically-operated vibrator 16 located within an enclosure 18, the latter acting, in a manner subsequently to be described, as a resonant cavity. Although the enclosure 18 may take a number of configurations, it is shown in the drawing as being essentially of cylindrical shape, and, for practical purposes, may comprise a hollow steel drum. The vibrator 16 is located essentially midway between the two end sections of the enclosure 18, as illustrated.

Before proceeding with a description of the vibrator 16 and the apparatus by means of which its operation is controlled, it should be pointed out that the entire assembly is suspended by a pair of supporting cables 20 from a pair of ring-shaped bands 22 which encircle the respective ends of a cylindrical flask 24 containing air which has been pressurized prior to submergence of the unit 10 below the surface of the body of water upon which the vessel 12 is floating. The air flask 24 is in turn supported by a further pair of cables 26 the upper ends of which are attached to the lower end of the cable 14 shown in FIG. 1. Consequently, the entire sound unit lies in the body of water with the longitudinal axis of the cylindrical container 18 oriented in a substantially horizontal position.

The vibrating element 16 is selected on the basis of its ability to develop high-amplitude acoustic energy. Although a number of types of vibrators may be utilized, it has been found in actual practice that the most suitable form is one in which a spring-loaded bi-directional piston is alternatively driven against the end portions of a rather massive housing structure. A vibrator of this type is manufactured commercially by the Branford Company of New Britain, Conn., as Series 2200, and is described in Bulletin No. 30 of this organization. The vibrator 16 possesses a pair of extending end portions 28, and, in the embodiment of the invention herein described, these extending end portions 28 are respectively secured to a pair of adaptors 30 which project beyond such portions 28 to the interior surface of the hollow cylindrical enclosure 18. Consequently, when each adaptor 30 is welded (or otherwise secured) both to its adjacent vibrator end portion 28 and to the interior surface of the drum 18, a rigid supporting structure for the vibrator 16 is produced which structure is capable of readily transmitting vibratory energy from the member 16 to the material of which the cylindrical enclosure 18 is composed. In other words, vibration of the member 16 will result in a corresponding vibration of the hollow cylindrical enclosure 18, and, if this vibration occurs at a frequency which essentially corresponds to the natural frequency of the cylindrical drum 18, then the latter will be effectively set into resonance and will develop acoustic energy of relatively high amplitude. The manner in which the resonant frequency of the member 18 is determined will be hereinafter described in connection with FIG. 4 of the drawings. At this point, however, it is only necessary to take into account the manner in which the vibrating member 16 is energized so that the unit 10 may function as a sound source for the purpose herein desired.

As above brought out, the vibrator 16 is of the preferably pneumatically-operated type. Consequently, some provision must be made for supplying it with air under pressure in order that it may function to develop the acoustic energy necessary for successful operation of the disclosed apparatus. From the tank or flask 24 (under which air under pressure has been stored prior to the initial operation of the system) air is conducted through a conduit 32 to a valve 34, and from this valve through a further conduit 36 to the entry port of the vibrator 16. The valve 34 functions to interrupt the flow of air reaching the vibrator in a selective manner so that the time periods during which the vibrator is operative, as well as the time periods between operating intervals, may be varied in accordance with the characteristics of the intelligence to be transmitted. Since this intelligence is preferably in the form of pulses, rapid and precise control over the operation of the valve 34 is desirable and this may be achieved in the embodiment shown by operating the valve 34 through the action of a solenoid 38 which is electrically energized and which is connected to a switching station (not shown) located on the vessel 12 by means of an electrical conductor 40. A junction box 42 may be employed to permit ready separation of the member 18 and its enclosed apparatus from the supporting cables. Operation of the solenoid 38 may readily be brought about by selective electrical energization of the conductor 40 so as to open and close the valve 34 in a manner well known in the art. Since such valves are conventional, no details as to the construction and operation of the components 34–38 are believed necessary for a proper understanding of the present invention. However, as set forth in FIG. 3 of the drawings, the drawings, the solenoid 38 may be of a type in which a plunger is actuated so as to selectively block passage of air to the output conduit 36. A typical solenoid air valve suitable for remote keying and hence capable of employment in the apparatus of FIGS. 2 and 3 is designated as ASCO Model 831471 manufactured by the Automatic Switch Co. of Florham Park, N.J.

To facilitate operation of the valve 34 and hence the vibrator 16, an exhaust conduit 44 is incorporated into the former so as to allow for the release or "bleeding" of any air which may become trapped during operation of the valve and to prevent back pressure from being built up in the output conduit 36. In similar fashion, a pair of "bleeder" conduits 46 are respectively provided at each end of the vibrator 16 to release air from the body of the vibrator following each cycle of reciprocation of the piston contained therein. For optimum efficiency of operation of the system, the conduits 46 may lead to another flask rather than being open to the water. However, the alternative has not been illustrated.

The vibrator 16 is of a type the frequency of vibration of which is dependent upon the pressure of air supplied thereto. This pressure may be controlled by means of a pressure regulator 48 of standard design. By proper adjustment of the regulator 48, it is possible to select a frequency of vibration of the member 16 which closely approximates the natural frequency of the hollow cylindrical enclosure 18. The latter may then be set into resonance to greatly augment the amplitude of the acoustic energy emitted therefrom. Once the natural frequency of vibration of the member 18 has been determined, and the pressure regulator 48 set so that the vibrator 16 operates at this particular determined frequency, no further adjustment of the regulator 48 is normally necessary during operation of the system. The manner in which the natural resonant frequency of the member 18 is determined will now be discussed along with a description of FIG. 4 of the drawings.

To eliminate the necessity for constructing the hollow cylindrical member 18 so as to withstand the relatively high hydrostatic pressure that exists at a considerable depth in the ocean, a plurality of apertures 50 are formed so that liquid (it will be assumed for the purpose of the following discussion that this liquid comprises sea water) is readily admitted to the interior of the assembly. This assumption is made necessary by the fact that the characteristic of the fluid filling the member 18 enters into a determination of its natural frequency. Furthermore, although this member 18 is being described as having a cylindrical configuration, it will be obvious that any other configurations will be suitable (such, for example, as a hollow sphere or pipe) as long as the unit is capable of being set into vibration when energized by a vibrator contained therewithin and attached thereto. However, as an example, the hollow cylindrical drum 18 of FIG. 2 is assumed to be filled with salt water, this hollow cylindrical drum having a length $l$, a radius $d$, and a thickness $h$. If the material of which the drum 18 is composed is steel, then the following basic formulas can be employed, these formulae being set forth in the publication "Textbook of Sound," by A. B. Wood:

$$\text{frequency} = \frac{\text{velocity}}{\text{wavelength}} = \frac{c}{\lambda}, \text{ and } \lambda = 2l$$

$$c = \frac{C_o}{\sqrt{1+\frac{2Kd}{hE}}}$$

where $E$ = Young's Modulus (Steel) = $19.5 \times 10^{11}$ dynes/cm.$^2$
$c$ = actual velocity of sound in water-filled drum
$C_o$ = free field sound velocity = 150,000 cm./sec.
$K$ = Bulk Modulus of salt water = $2.24 \times 10^{10}$ dynes/cm.$^2$
$\lambda$ = wavelength of acoustic energy Purely as an example, it may be assumed that the hollow cylindrical drum 18 of FIGS. 2 and 4 has a length $l$ of 89 cm., an inside radius $d$ of 28.2 cm., and wall thickness $h$ of .159 cm.

These values may be substituted into the above formula as follows:

$$f = \frac{C_o}{\left[\sqrt{1+\frac{2Kd}{hE}}\right]2l} = \frac{1.5 \times 10^5}{2(89)\sqrt{1+\frac{2(2.24)\times 10^{10}(28.2)}{(.159)(19.5 \times 10^{11})}}}$$

from which $f = 375$ cycles/sec.

The member 18 may thus possess a resonant frequency of 375 cycles per second. If the frequency of operation of the vibrator 18 is set by means of the pressure regulator 48 to be at approximately this same frequency, then the member 18 will be set into resonance so as to emit acoustic vibrations at a relatively high amplitude for transmission over considerable distances through the body of liquid into which the sound unit has been immersed.

Obviously many types of pneumatically operated sound sources other than one having a reciprocating piston are embraced within the present concept. Also, other components capable of being mechanically vibrated, such as reeds and elastic membranes, may under certain circumstances be employed. Also, it is obviously possible to conduct pressurized air to the regulator 48 through a long hose from a source carried on the vessel 12. However, as previously mentioned, this expedient is less desirable than that shown, since the weight of a hose of sufficient length to perform this function will be excessive in most practical applications.

Although not shown in the drawings, it is contemplated to add a receiving hydrophone to the unit shown in FIGS. 1 and 2, this hydrophone being electrically connected to detecting equipment on vessel 12 by means of an additional electrical conductor. However, this is entirely optional, and represents a conventional employment of such receiving apparatus.

Obviously many modifications and variations of the present invention are possible in the light of the above teachings. It is therefore to be understood that within the scope of the appended claims the invention may be practiced otherwise than as specifically described.

I claim:
1. A high-power underwater sound source designated for deep submergence and capable of being selectively controlled from the surface so as to produce pulses of variable spacing and time duration and possessing broadband frequency characteristics, said sound source comprising:
   a pneumatically-operated vibrator developing acoustic energy and adapted to operate over a given frequency band;
   a chamber enclosing said vibrator and to which the latter is attached, said chamber having a natural frequency of vibration and being provided with at least one aperture designed to permit the passage of fluid therethrough;
   means for operating said vibrator at the natural frequency of vibration of said chamber;
   whereby said chamber is caused to resonate to increase the acoustic output of said source above the highest level capable of being reached solely by operation of said vibrator;
   a container of pressurized air forming part of said sound source and submersible therewith, and means, controllable from the surface, for selectively admitting air from said container to said vibrator to determine the time periods during which acoustic energy is developed.
2. An underwater sound source in accordance with claim 1, in which the means for selectively admitting air from said container to said vibrator includes an air valve and electrically-energizable means for controlling the time periods during which air passes through said valve.

3. The combination of claim 2, in which said electrically-energizable means includes a solenoid selectively operable to open and close said valve to the passage of air therethrough.

4. The combination of claim 1, in which the means for operating said vibrator at the natural frequency of vibration of said chamber includes means for selectively controlling the pressure of the air admitted to said vibrator from said container.

References Cited

UNITED STATES PATENTS

| | | | |
|---|---|---|---|
| 3,123,043 | 3/1964 | Bodine | 116—137 |
| 3,226,671 | 12/1965 | Padberg | 340—5 |

RODNEY D. BENNETT, *Primary Examiner.*

RICHARD A. FARLEY, *Examiner.*